Oct. 7, 1958 J. W. HAGER 2,854,956
STEERING DAMPER FOR AIRCRAFT NOSE WHEEL ASSEMBLY
Filed Nov. 19, 1956 5 Sheets-Sheet 1
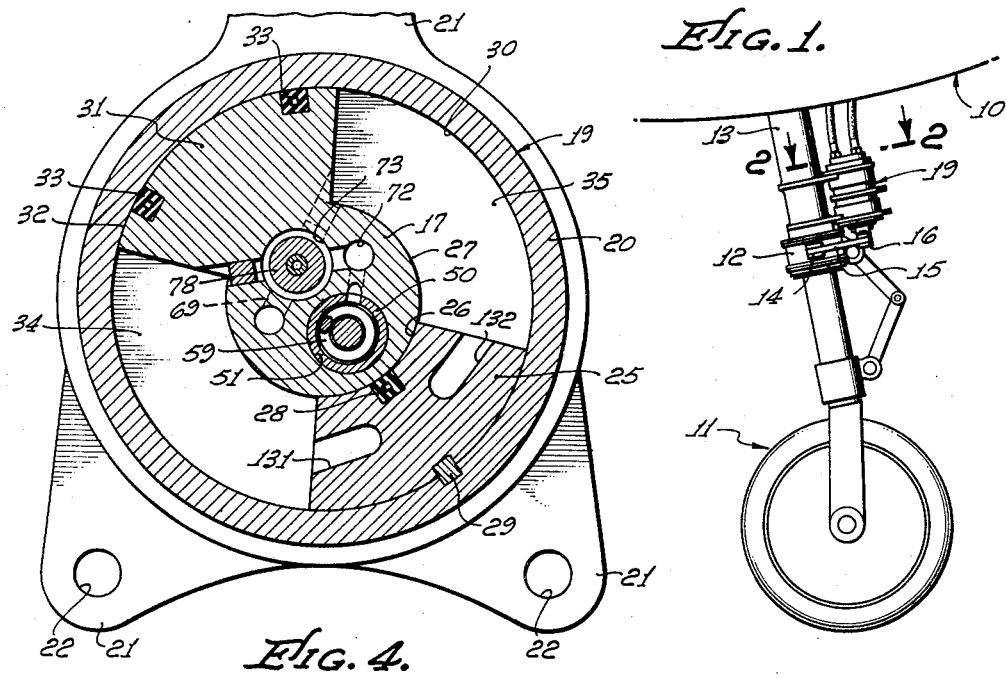
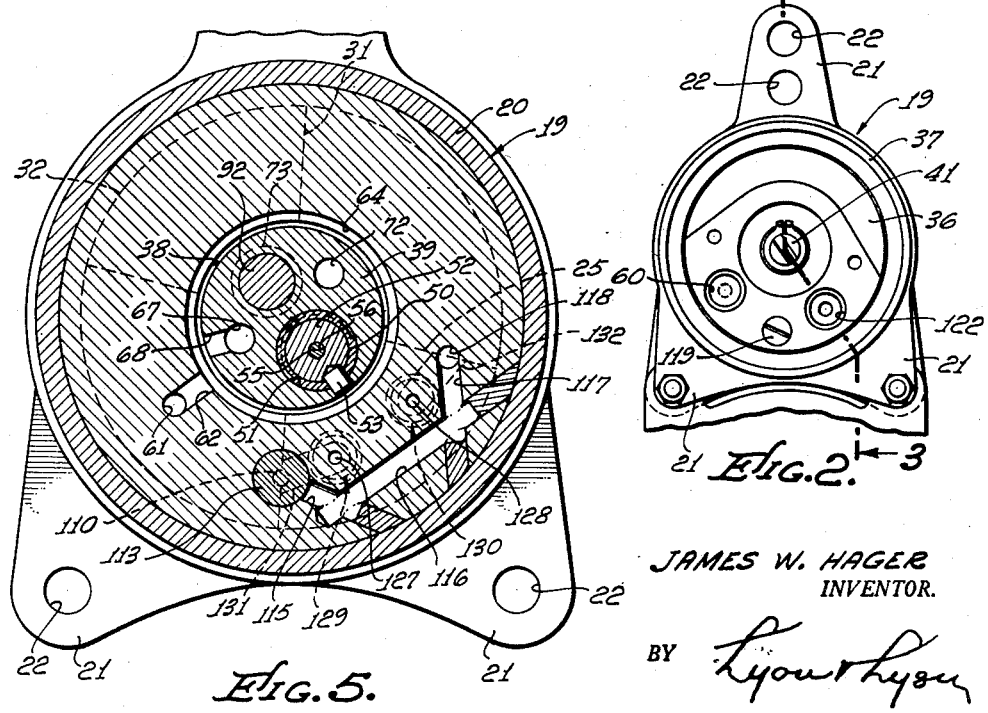
JAMES W. HAGER
INVENTOR.
BY
ATTORNEYS.

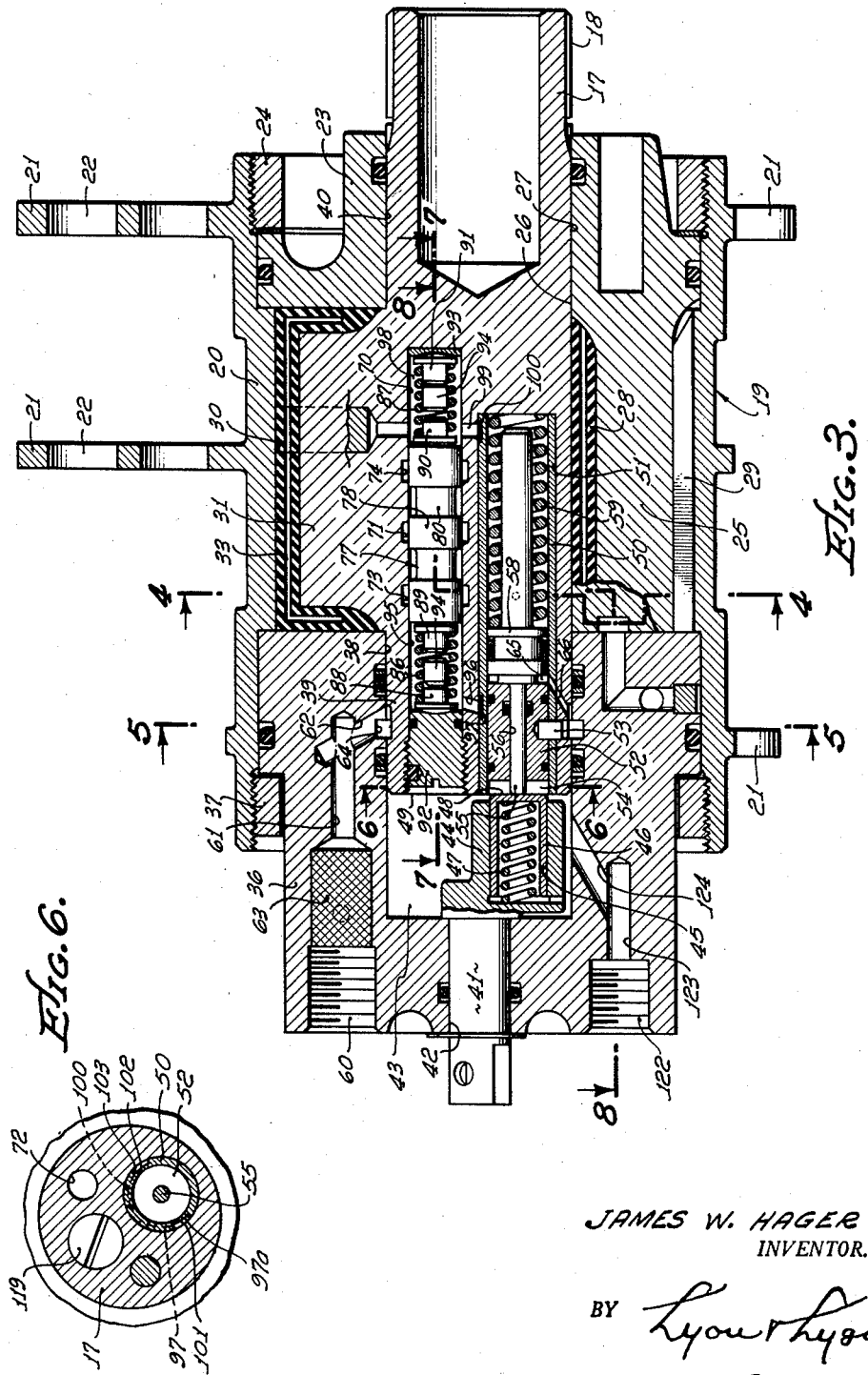

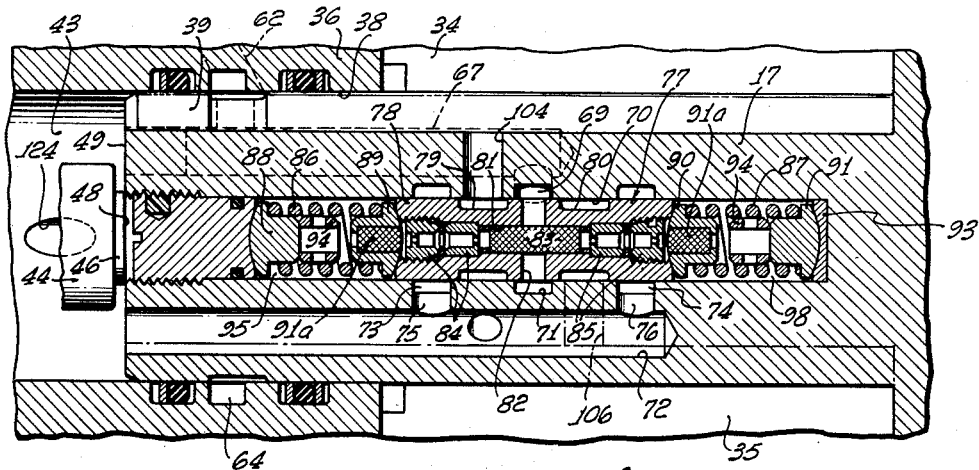

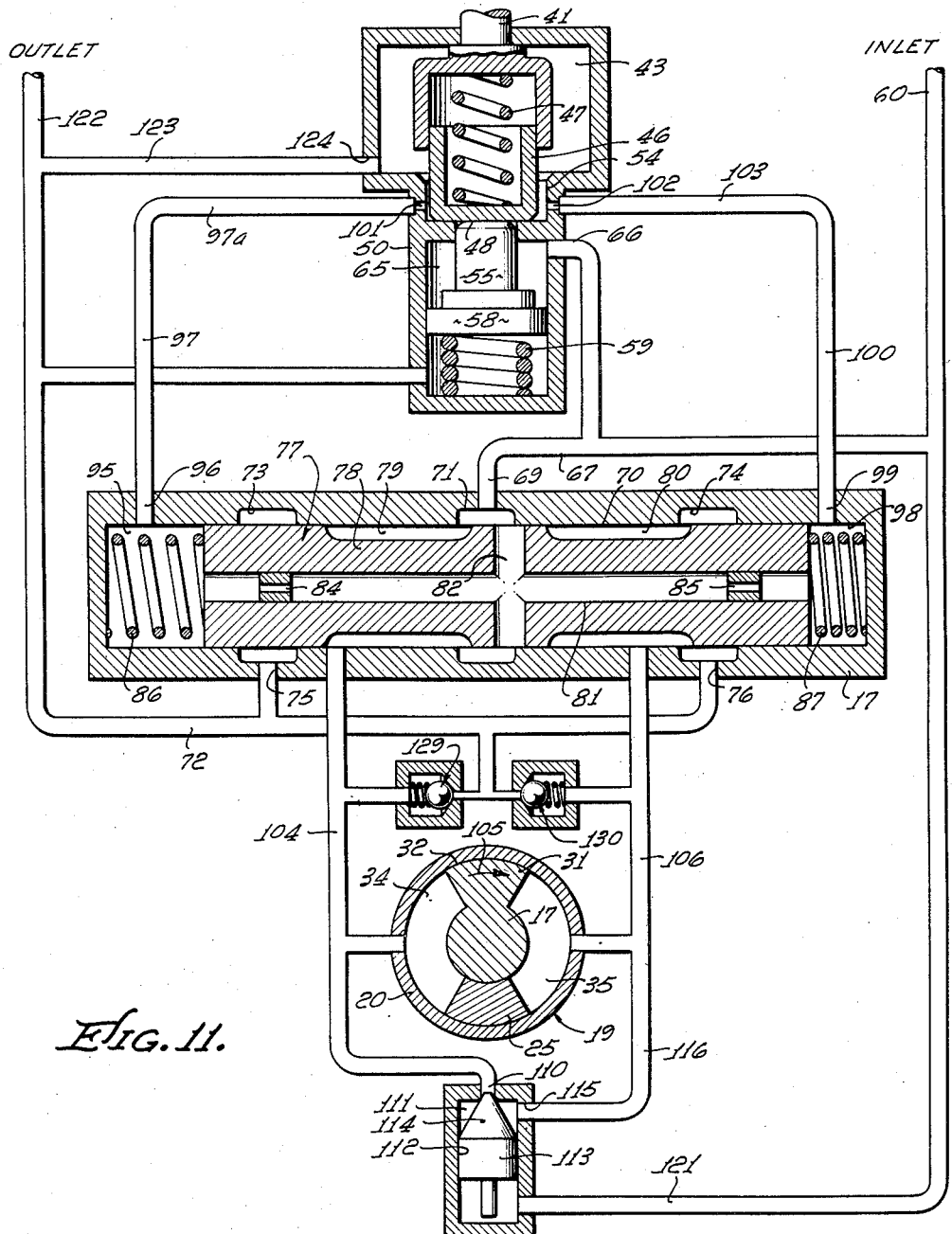

2,854,956

STEERING DAMPER FOR AIRCRAFT NOSE WHEEL ASSEMBLY

James W. Hager, Alhambra, Calif., assignor to Clemco Aero Products, Inc., Compton, Calif., a corporation of California Application November 19, 1956, Serial No. 622,859

8 Claims. (Cl. 121—41)

This invention relates to apparatus for turning a driven member and for damping oscillatory motion thereof. This invention finds particular usefulness in connection with a steer damper for an aircraft nose wheel assembly although this is by way of illustration and the invention is not limited to such use.

Among the advantages of devices embodying this invention over conventional devices now in use are its relative simplicity, the requirement of very small control forces, the feature that steering torque is not available until the driven shaft and the control shaft have been brought into angular alignment, and the versatility of control characteristics obtainable by minor design variations. Other and more detailed objects and advantages will appear from a consideration of the drawings in which:

Figure 1 is a side elevation in diagrammatic form showing an aircraft nose wheel assembly incorporating a device embodying this invention.

Figure 2 is a plan view taken substantially on the lines 2—2 as shown in Figure 1.

Figure 3 is a sectional view taken substantially on the lines 3—3 as shown in Figure 2.

Figure 4 is a transverse sectional view taken substantially on the lines 4—4 as shown in Figure 3.

Figure 5 is a transverse sectional view taken substantially on the lines 5—5 as shown in Figure 3.

Figure 6 is a transverse sectional view taken substantially on the lines 6—6 as shown in Figure 3.

Figure 7 is an axial sectional view taken substantially on lines 7—7 as shown in Figure 3.

Figure 8 is a sectional detail taken substantially on lines 8—8 as shown in Figure 3.

Figure 9 is a perspective view showing fluid passages and ports on one of the parts of the mechanism.

Figure 11 is a schematic diagram similar to Figure 10 showing the parts in position to apply hydraulic power to turn the driven member.

Figure 10:
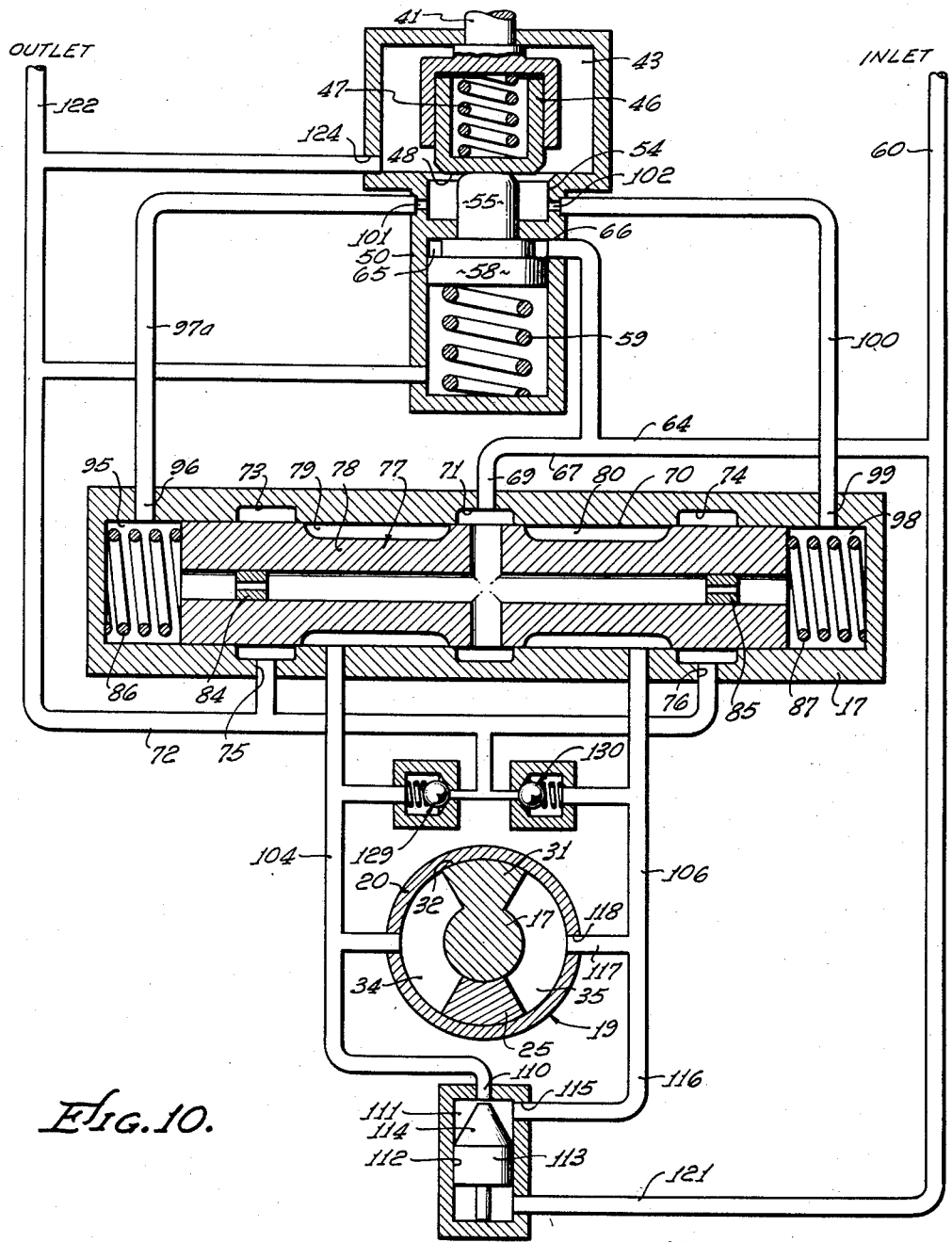
Figure 10 is a schematic diagram showing position of the parts when the device is in use to damp oscillatory movement or "shimmy" of the nose wheel assembly or other controlled member.

Referring to the drawings, the aircraft generally designated 10 is provided with a nose wheel assembly 11 which includes a rotatable collar 12 carried on a retractable support 13. An arm 14 on a collar is connected by a link 15 to an arm 16 mounted on a driven shaft 17. One end of the shaft 17 is splined as shown at 18 to provide a driving connection with the arm 16.

The driven shaft 17 is rotatably mounted within a housing generally designated 19. This housing includes a stationary shell 20 having mounting brackets 21 provided with apertures 22 to receive fastening devices (not shown). An end member 23 is fixed at one end of the sleeve 20 by means of the clamping nut 24 and this member 23 includes a dam 25 which projects radially inwardly toward the rotary axis of the driven shaft 17. The dam 25 has an arcuate surface 26 which contacts the cylindrical surface 27 on the shaft 17. A sealing element 28 extends longitudinally to form a seal between the surfaces 26 and 27. A key 29 prevents turning movement of the dam 25 with respect to the shell 20.

The shell 20 is provided with an internal cylindrical surface 30 which is interrupted by the dam 25. The shaft 17 is provided with a radial extension or fin 31 having an outer surface 32 which contacts the internal cylindrical surface 30 in sealing relationship. Sealing elements 33 extend longitudinally on the fin 31 to seal against the surface 30. The driven shaft 17 with its fin 31 cooperates with the bore 30 and dam 25 to define fluid chambers 34 and 35. When the driven shaft 17 is turned, one of these chambers becomes larger and the other becomes smaller. Conversely, when pressure is applied to one of these chambers and exhausted from the other, the driven shaft 17 is caused to turn in the direction to increase the size of the pressurized chamber.

The end member 36 is fixed to the shell 20 by means of the clamping nut 37 and this end member is provided with a cylindrical bore 38 to provide a journal for the projecting end 39 of the driven shaft 17. The other journal 40 for the shaft 17 is provided by the end member 23. A control shaft 41 is mounted coaxially of the driven shaft 17 and is rotatably supported in the bore 42 on the end member 36. The bore 38 defines a cavity 43 within the end member 36 and the control shaft extends into this cavity. An offset portion 44 on the control shaft is provided with an axially extending bore 45 which slidably receives a hollow plunger 46. A coil spring 47 mounted within the plunger 46 urges the end 48 of the plunger into sliding contact with the end surface 49 on the driven shaft 17.

A sleeve 50 is mounted in a bore 51 on the driven shaft 17 and one end of this sleeve is flush with the end surface 49. A hollow plug 52 is fixed within the sleeve. A pin 53 maintains the sleeve 50 and plug 52 against movement relative to the driven shaft 17. The sleeve and plug cooperate to define a socket 54 for reception of the hollow plunger 46. However, means are provided for preventing entry of the plunger into the socket and, as shown in the drawings, this means includes a pin 55 slidably mounted within bore 56 in the plug 52 and formed integrally with piston 58 which is slidably mounted within the bore of the sleeve 50. A coil spring 59 acts on the piston 58 to project the pin 55 so that its extending end is substantially flush with the end surface 49 on the driven shaft 17.

The inlet bore 60 within the end member 36 communicates with passages 61 and 62 via filter 63. The passage 62 communicates with groove 64 and this in turn communicates with space 65 within the sleeve 50 via aligned ports 66. It will be understood from this description that when pressure fluid is supplied to the inlet 60 it is effective to retract the piston 58 against the action of the spring 59 and thereby retracts the pin 55 into the plug 52. Subsequent turning movement of the control shaft 41 permits the plunger 46 to move axially into the socket 54 when the plunger and socket come into alignment. Manually operable means (not shown) are provided for turning the control shaft 41.

As shown in Figure 5, the groove 64 also communicates with passage 67 via port 68. The passage 67 is formed in the driven shaft 17 and extends axially thereof as shown in dotted lines in Figure 7. Port 69 connects passage 67 with axial bore 70 via a groove 71. Passage 72 extends axially within the driven shaft 17 from the cavity 43 and communicates with the axial bore 70 through grooves 73, 74 and through ports 75 and 76 respectively.

A valve assembly generally designated 77 is mounted on the driven shaft 17, and that valve assembly includes the valve spool 78 slidably mounted for axial movement within the bore 70. The spool 78 has two axially spaced grooves 79 and 80 on its outer periphery. The spool has a central axial bore 81 and a transverse intersection bore 82. The spool 78 is symmetrical about the axis of the bore 81 and is also symmetrical about the axis of the bore 82. A filter element 83 is mounted in the longitudinal bore 81 in a position to intersect the transverse bore 82. Restrictor elements 84 and 85 are mounted in both ends of the longitudinal bore 81 of the spool 78. Pressure fluid admitted through the port 69 and groove 71 passes through transverse bore 82, filter 83 and passes axially in opposite directions through the restrictors 84 and 85.

The spool 78 is held in a central position within the bore 70 as shown in Figure 7 by means of coil springs 86 and 87. Each of the springs acts against self-centering flanged elements 88, 89, 90 and 91. The elements 89 and 90 may be provided with filters 91 and each of these elements engages one end of the spool 78. Element 88 engages a plug 92 fixed in one end of the bore 70. The element 91 engages a pad 93 at the other end of the bore 70. Hollow sleeves 94 are provided within the springs 86 and 87 and serve to limit axial travel of the spool 78 in either direction. The space 95 within the bore 70 and between the plug 92 and the valve spool 78 is connected by port 96 with groove 97 on the outer periphery of the sleeve 50. Similarly, space 98 within the bore 70 and between the spool 78 and the pad 93 is connected by port 99 with groove 100 on the outer periphery of the sleeve 50. The grooves 97 and 100 are shown in the perspective view in Figure 9. Groove 97 communicates with control port 101 via longitudinal groove 97a. Similarly, groove 100 communicates with control port 102 via longitudinal groove 103. From this description it will be understood that a first leakage path is provided from the high pressure port 69 through the longitudinal bore 81 in the spool 78 and through the restrictors 84, space 95, port 96, grooves 97 and 97a and control port 101. Similarly, a second leakage path is provided from the high pressure port 69 through central bore 81 in the spool 78, restrictors 85, space 98, port 99, grooves 100 and 103 and control port 102.

So long as the restriction of discharge through control ports 101 and 102 remains equal, the back pressure in the spaces 95 and 98 remains equal with the result that the springs 86 and 87 hold the valve spool 78 in the central position shown in Figures 3 and 7. Should the restriction at the control port 101 increase relative to that at control port 102, the back pressure in the space 95 would exceed that in space 98 with the result that the valve spool 78 would be shifted to the right as viewed in Figures 3 and 7. High pressure fluid would then flow from port 69 into groove 79 and through port 104 into chamber 34 on one side of the fin 31. At the same time the fluid in chamber 35 may flow unrestricted through 106, 80, 74, 76, 72, 43, 124 and 123 to outlet 122. This would cause the fin and driven shaft 17 to turn in the direction of the arrow 105 as shown in Figure 11. Similarly, should the restriction at the control port 102 increase relative to that at control port 101, the back pressure in space 98 would exceed that in the space 95 with the result that spool 78 would be shifted to the left as viewed in Figures 3 and 7. The high pressure port 69 would then communicate through groove 80 and port 106 with the chamber 35, on the other side of the fin 31. The fluid in chamber 34 may flow unrestricted through 106, 79, 73, 75, 72, 43, 124 and 123 to outlet 122. This action would cause the driven shaft 17 to turn in the direction opposite to that shown by the arrow 105.

The axially movable plunger 46 on the control shaft 41 does not fit tightly within the socket 54 but on the contrary, has some slight clearance with respect to the bore of the sleeve 50. Therefore, turning of the shaft 41 in either direction when the plunger 46 is engaged within the socket 54 serves to restrict the discharge from one of the control ports 101, 102, relative to the other. This, in turn, causes shifting of the valve spool 78 to introduce pressure fluid into the chambers 34 and 35, and means for fluid to escape in the alternate chambers, as described above, resulting in rotation of shaft 17 until it is in alignment with shaft 41.

A restricted by-pass is provided in the end member 36 connecting the chambers 34 and 35. As best shown in Figure 8, this by-pass includes a restricted orifice 110 interposed between the chamber 34 and the space 111 within the bore 112. A shutoff valve 113 is slidably mounted for axial movement between the bore 112 and is provided with a conical head 114 adapted to seat within the orifice to shut off flow. Space 111 communicates through port 115 (Figure 5), passage 116, port 117 and passage 118 with the space 35. When the shut-off valve 114 closes the orifice 110, the restricted passage between the chambers 34 and 35 is cut off. When the shut-off valve 113 is in the open position as shown in Figure 8, the by-pass permits flow between the chambers 34 and 35 but the orifice 110 restricts the rate of flow so that substantial damping forces are provided to oppose oscillatory movement or "shimmy" of the driven shaft. An adjustable plug 119 is mounted on the member 36 and serves to limit opening movement of the shut-off valve 113. This in turn, varies the tensity of the restricting action through the orifice 110. The shut-off valve 113 is closed whenever high pressure fluid is admitted into the space 120 through port 121 which communicates with the inlet 60.

The outlet connection 122 communicates with the cavity 43 through passages 123 and 124. Accordingly, control fluid discharged through the control ports 101 and 102 passes into the cavity 43 and out through the outlet connection 122. Similarly, fluid discharged from chambers 34 or 35 through the valve assembly 77 passes through discharge passage 72 into the cavity 43.

The plug 92 is adjustable so that the spool 78 may be accurately centered in position at time of assembly.

In the event that the chambers 34 and 35 are not completely filled with fluid, fluid at system back pressure will flow through ports 125 and 126 (Figure 8) and through the replenishing valve assemblies 129 and 130. These valve assemblies act as check valves to permit fluid to enter the chambers 34 and 35 through milled slots 131 and 132 respectively, but to prevent reverse flow.

The operation of damping oscillatory movement of the driven shaft 17 is shown diagrammatically in Figure 10. A valve (not shown) cuts off the supply of pressure fluid to the inlet 60. This in turn cuts off a supply of pressure fluid to the space 65 with the result that the spring 59 projects the interference pin 55 to expel the plunger 46 from the socket 54. Turning movement of the control shaft 41 therefore has no effect on the position of the driven shaft 17. The shut-off valve 113 remains open because no pressure is supplied through passage 121. Accordingly, fluid may pass between the chambers 34 and 35 through the restricted by-pass which includes the orifice 110. Oscillatory movement or "shimmy" of the nose wheel assembly 11 and driven shaft 17 is therefore opposed by the damping force of the fluid passing through the restricted orifice 110.

The operation of steering the nose wheel assembly 11 and driven shaft 17 is shown diagrammatically in Figure 11. Pressure is applied to the inlet 60 and this pressure is applied to space 65 to retract the interference pin 55 and compress the spring 59. The axially movable plunger 46 on the control shaft 41 is then free to enter the socket 59 under action of the spring 47 whenever the control shaft 41 is turned to a position to bring the plunger 46 and socket 54 into alignment. It is an advantageous feature of this invention that steering torque is not available until control shaft 41 and output shaft 17 are in alignment.

Pressure fluid passes through passage 121 to cause the shut-off valve 113 to close the orifice 110. This action closes the restricted by-pass between the chambers 34 and 35. When the control shaft 41 is manually turned in a direction to move the plunger 46 to the left, as viewed in Figure 11, a restriction is imposed upon the discharge of pressure fluid through the control port 101, as compared to the restriction at the control port 102. Back pressure in the space 95 therefore exceeds the back pressure in the space 98, with the result that the spool 78 of the valve assembly 77 is shifted to the right. High-pressure fluid from port 69 then passes through groove 71 and 79 and into the chamber 34 through passage 104. At the same time the fluid is exhausted from chamber 35 through passage 106, grooves 80 and 74, passageway 72 and outlet 122, the driven shaft 17 and the nose wheel assembly 11 turn in the direction of the arrow 105.

Similarly, turning of the control shaft 41 in a direction to move the plunger 46 to the right, as viewed in Figure 1, would serve to restrict the control port 102 to an extent greater than the restriction on the control port 101. This would cause the spool 78 to move to the left, as viewed in Figure 11, to cause introduction of high-pressure fluid into chamber 35 and to exhaust fluid from the chamber 34, causing the driven shaft 17 to turn in the direction opposite to that of the arrow 105. The parts remain in position for steering so long as pressure is applied to the inlet 60.

Having fully described my invention, it is to be understood that I do not wish to be limited to the details herein set forth, but my invention is of the full scope of the appended claims.

I claim:

1. A device for turning a driven member and for damping oscillatory motion thereof, comprising in combination: a stationary housing, a driven shaft mounted to turn in the housing and having connection means to turn the driven member, fluid pressure means within the housing for turning the driven shaft in either direction, said means including first and second fluid chambers, conduit means connecting the chambers and having a flow restricting orifice therein to oppose rapid flow of fluid between the chambers and thereby to damp motion of the driven shaft, a control shaft turnably mounted in the housing coaxially of the driven shaft, the driven shaft having a socket and the control shaft having an axially movable plunger adapted to be received in the socket, and axially movable pin for preventing entry of the plunger into the socket, and pressure operated means adapted to close the orifice and to retract the pin to an inoperative position.

2. A device for turning a driven member, comprising in combination: a stationary housing, a driven shaft mounted to turn in the housing and having connection means to turn the driven member, fluid pressure means within the housing for turning the driven shaft in either direction, said means including a valve, a control shaft turnably mounted in the housing, one of the shafts having a socket and the other having a movable plunger adapted to be received in the socket, interference means for preventing entry of the plunger into the socket, means responsive to said fluid pressure means adapted to render the interference means inoperative, and means including cooperating parts on the plunger and socket for actuating said valve.

3. A device for turning a driven member, comprising in combination: a stationary housing, a driven shaft mounted to turn in the housing and having connection means to turn the driven member, fluid pressure means within the housing for turning the driven shaft in either direction, said means including a valve on the driven shaft, a control shaft turnably mounted in the housing coaxially of the driven shaft, one of the shafts having a socket and the other having an axially movable plunger adapted to be received in the socket, interference means for preventing entry of the plunger into the socket, means responsive to said fluid pressure means adapted to render the interference means inoperative, and means including cooperating parts on the plunger and socket for actuating said valve.

4. A device for turning a driven member, comprising in combination: a stationary housing, a driven shaft mounted to turn in the housing and having connection means to turn the driven member, fluid pressure means within the housing for turning the driven shaft in either direction, said means including a valve on the driven shaft, a control shaft turnably mounted in the housing coaxially of the driven shaft, the driven shaft having a socket and the control shaft having an axially movable plunger adapted to be received in the socket, an axially movable pin on the driven shaft for preventing entry of the plunger into the socket, means responsive to said fluid pressure means adapted to retract the pin to an inoperative position and means including cooperating parts on the plunger and socket for actuating said valve.

5. A device for turning a driven member, comprising in combination: a stationary housing, a driven shaft mounted to turn in the housing and having connection means to turn the driven member, fluid pressure means including first and second chambers within the housing for turning the driven shaft in either direction, said means including a valve on the driven shaft adapted to direct pressure fluid into either of said chambers, a control shaft turnably mounted in the housing, the driven shaft having a socket and the control shaft having a movable plunger adapted to be received in the socket, interference means for preventing entry of the plunger into the socket, means responsive to said fluid pressure means adapted to render the interference means inoperative, means providing a pair of leakage paths communicating with the valve and terminating in ports within the socket, whereby restriction of one port relative to the other occasioned by transverse movement of the plunger within the socket is effective to develop back pressure to actuate the valve.

6. A device for turning a driven member, comprising in combination: a stationary housing, a driven shaft mounted to turn in the housing and having connection means to turn the driven member, fluid pressure means including first and second chambers within the housing for turning the driven shaft in either direction, said means including a valve on the driven shaft adapted to direct pressure fluid into either of said chambers, a control shaft turnably mounted in the housing, the driven shaft having a socket and the control shaft having a movable plunger adapted to be received in the socket, means providing a pair of leakage paths communicating with the valve and terminating in ports within the socket, whereby restriction of one port relative to the other occasioned by transverse movement of the plunger within the socket is effective to develop back pressure to actuate the valve.

7. A device for turning a driven member, comprising in combination: a stationary housing, a driven shaft mounted to turn in the housing and having connection means to turn the driven member, fluid pressure means including first and second chambers within the housing for turning the driven shaft in either direction, said means including a valve on the driven shaft adapted to direct pressure fluid into either of said chambers, a control shaft turnably mounted in the housing, coaxially of the driven shaft, the driven shaft having a socket and the control shaft having a plunger adapted to move axially into the socket, means providing a pair of leakage paths on the driven shaft communicating with the valve and terminating in ports within the socket, whereby restriction of one port relative to the other occasioned by transverse movement of the plunger within the socket is effective to actuate the valve.

8. A steer damper for an aircraft nose wheel assembly, comprising in combination: a stationary housing, a driven shaft mounted to turn in the housing and having connection means to turn the nose wheel assembly, fluid pressure means including first and second chambers within the housing for turning the driven shaft in either direction, said means including a valve on the driven shaft adapted to direct pressure fluid into either of said chambers, a restricted by-pass connecting the chambers, pressure operated means to close the by-pass, a control shaft turnably mounted in the housing, the driven shaft having a socket and the control shaft having a plunger adapted to move axially into the socket, means providing a pair of leakage paths on the driven shaft communicating with the valve and terminating in ports within the socket, whereby restriction of one port relative to the other occasioned by transverse movement of the plunger within the socket is effective to actuate the valve.

References Cited in the file of this patent

UNITED STATES PATENTS

| | | |
|---|---|---|
| 2,589,341 | Chisholm et al. | Mar. 18, 1952 |
| 2,654,347 | Clark | Oct. 6, 1953 |